United States Patent [19]

Bowers

[11] 4,210,453
[45] Jul. 1, 1980

[54] CARBON BONDED REFRACTORY BRICK COMPOSITION

[75] Inventor: Donald J. Bowers, Jackson, Ohio

[73] Assignee: Davis Refractories, Inc., Oak Hill, Ohio

[21] Appl. No.: 958,828

[22] Filed: Nov. 8, 1978

[51] Int. Cl.² ............................................. C04B 35/52
[52] U.S. Cl. ..................................................... 106/56
[58] Field of Search ........................................ 106/56

[56] References Cited

U.S. PATENT DOCUMENTS

| | | | |
|---|---|---|---|
| 3,329,514 | 7/1967 | Saunders et al. | 106/56 |
| 3,442,669 | 5/1969 | Osterholtz | 106/56 |
| 4,130,438 | 12/1978 | Watanabe et al. | 106/56 |

Primary Examiner—James Poer
Attorney, Agent, or Firm—Stanley J. Price, Jr.; John M. Adams

[57] ABSTRACT

A composition for molding refractory bricks having improved stability and load resistance in a furnace at elevated temperatures includes between 50 to 97 percent by weight of a pulverulent sized refractory material and between 3 to 27 percent by weight carbon. The carbon in the composition before curing at elevated temperatures includes a liquid carbonaceous bonding resin which improves the moldability of the composition before curing and provides high strength and rigidity to the brick after curing at elevated temperatures.

4 Claims, No Drawings

CARBON BONDED REFRACTORY BRICK COMPOSITION

BACKGROUND OF THE INVENTION

1. Field of the Invention

This invention relates to a composition for molding refractory bricks and more particularly to a composition containing a carbonaceous liquid bonding resin.

2. Description of the Prior Art

In conventional bonded shaped refractory articles, a coal tar pitch is employed as the carbon-bonding percursor. The pitch softens when heated and the softening characteristic is employed to provide the original moldability to the composition in the hot-molding step. When the bricks, however, are installed in a furnace, the pitch constituent softens as a furnace is heated threatening the shape and integrity of the furnace lining. There is, therefore, considerable dependence on the external steel casing of the furnace and internal metallic plating to maintain rigity of the bricks in the furnace.

The use of resins as a constituent of refractory compositions is known. For example in U.S. Pat. No. 3,329,514 there is disclosed a method of making a refractory body that includes refractory materials, graphite and a carbon forming binder. This carbon forming binder is described as tar or pitch which is arranged to hold the mass together when compacted into desired shapes. It is stated in this patent that synthetic resins which carbonize on heating may also be used in whole or in part as the original binder. It is further stated that resins such as furfuryl alcohol resins, phenolic or urea resins may be used to yield between 4 and 7 percent of the porous carbon binder after the composition is calcined at a temperature of 2000° F. or higher. The above patent is principally directed to a refractory body that includes finely divided silicon nitride dispersed throughout the carbon in the refractory composition. It appears that the refractory compositions are compacted and shaped in a mold and subjected to curing temperatures in excess of 2000° F. to permit the silicon to combine with the carbon and form a silicon nitride.

Other patents which disclose the use of resin binders are U.S. Pat. Nos. 4,058,403; 3,342,627; 4,036,798 and 3,969,124.

There is a need for a refractory composition that can provide stability and load resistance when the shaped refractory bodies are subjected to initial elevated temperatures in the furnace.

SUMMARY OF THE INVENTION

This invention relates to a moldable refractory composition for making refractory brick which includes about 50 to 90 parts by weight periclase and between 3 to 27 parts by weight carbon. A portion of the carbon prior to subjecting the composition to curing at elevated temperatures is in the form of a liquid carbonaceous bonding resin. For example, the liquid carbonaceous bonding resin may be a phenolic liquid resin such as a phenol formaldehyde bonding resin. The liquid carbonaceous bonding resin may be present in an amount of about 8 percent by weight of the uncured refractory composition. To provide dispersion of the resin, it is preferable that about 25 percent of the liquid bonding resin be present as a phenolic resin powder. A preferred composition comprises about 80 percent periclase refractory material, 12 percent graphite and about 8 percent bonding resin.

DESCRIPTION OF THE PREFERRED EMBODIMENT

The moldable refractory composition includes principally a pulverulent refractory material and carbon. The refractory material may be selected from any suitable refractory material or mixtures thereof, such as chrome ore, calcined alumina, boxite, silicon carbide, periclase and the like. Preferably, the refractory material is size graded to permit a more compact shaped article. For example, where the periclase is employed as the particulate refractory material, a preferred size distribution includes about 34 percent by weight of the periclase having a size which passes through a 4 mesh Tyler Standard Screen and is retained on a 10 mesh screen, and about 28 percent by weight having a size which passes through a 10 mesh screen and is retained on a 35 mesh screen, about 14 percent by weight having a size which passes through a 35 mesh screen and about 34 percent by weight having a size which passes through a 150 mesh screen.

In the preferred refractory composition, about 12 percent graphite having a size of less than 35 mesh is employed to provide lubricity and carbon to the refractory composition. The remaining carbon is supplied by either a liquid resin or a combination of liquid and dry powdered resin. One preferred refractory composition includes about 2 percent by weight of a dry phenolic resin powder designated MD 34 Resin sold by Borden Chemical Company, Columbus, Ohio, and about 6 percent by weight of a phenol formaldehyde liquid bonding resin designated FB 820-69 sold by Borden Chemical Company, Columbus, Ohio. In another preferred refractory composition, about 8 percent by weight of the composition is a DURITE phenolic liquid resin designated FL-935-137 and sold by Borden Chemical Company, Columbus, Ohio. It appears the latter phenolic liquid resin contains within the liquid mixture a solid resin powder and may be utilized without adding dry resin powder.

The molded refractory brick is prepared by admixing the refractory material, graphite and the liquid resin to form a moldable admixture. The admixture is positioned in conventional molding apparatus and subjected to pressure to form shaped bricks within the mold. By using the liquid bonding resin, no heat is required during the molding step.

After the shaped bricks are removed from the mold, the bricks are subjected to an elevated temperature, as for example 250° F. for a period of about 8 hours to cure the resin and to provide rigidity and strength to the bricks. The cured bricks are then in a condition to be installed in the furnace. It has been discovered that the bricks remain rigid during the initial furnace heat-up and the furnace heat converts the resin to carbon providing a highly temperature resistant and thermal shock resistant bonding matrix for the brick. The exposed surface of the brick after initial heat-up is glazed with a layer of the slag-like material within the furnace to minimize degradation of the carbon bonding matrix of the brick.

A suitable refractory composition of the present invention may include between 3 to 27 percent carbon, a size graded mixture of between about 50 to 97 percent periclase and where desired between 0 to 40 percent chrome ore.

The non-restricted example of a composition according to the invention is given below by way of example only.

EXAMPLE

| Amount, % by wt. | Component | Mesh Size |
|---|---|---|
| 26.9 | Periclase | −4+10 |
| 22.2 | Periclase | −10+35 |
| 11.0 | Periclase | −35 |
| 19.6 | Periclase | −150 ball mill fines |
| 11.5 | Graphite | |
| 0.8 | Clay | |
| 2.0 | MD 34 Resin (a) (Dry) | |
| 6.0 | FB 820–69 (2) (Liquid) | |

(1) A dry phenolic resin powder made by Borden Chemical Company, Columbus, Ohio.
(2) A phenol formaldehyde liquid bonding resin made by Borden Chemical Company, Columbus, Ohio.

The above constituents are admixed and positioned in a mold where the composition is subjected to pressure to form shaped bricks. The bricks are then removed from the mold and subjected to an elevated temperature of about 250° F. for a period of about 8 hours. The curing of the shaped bricks provides high strength and rigidity and remain rigid when subjected to elevated temperatures after installation in a furnace.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A moldable refractory composition for making a compact shaped body which includes about 75 percent by weight periclase with about 34 percent of said periclase having a size which passes through a 4 mesh Tyler Standard Screen and is retained on a 10 mesh screen, about 28 percent by weight having a size which passes through a 10 mesh screen and is retained on a 35 mesh screen, about 14 percent by weight having a size which passes through a 35 mesh screen and about 34 percent by weight having a size which passes through a 150 mesh screen and about 25 percent by weight carbon, a portion of said carbon prior to subjecting said composition to curing at elevated temperatures being in the form of a liquid carbonaceous bonding resin.

2. A moldable refractory composition for making a compact refractory brick consisting essentially of about 80 percent by weight periclase, about 12 percent graphite and about 8 precent bonding resin.

3. A moldable refractory composition as set forth in claim 2 in which said bonding resin includes about 25 percent by weight dry phenolic powder and about 75 percent by weight phenol formaldehyde liquid bonding resin.

4. A moldable refractory composition as set forth in claim 2 in which said bonding resin consists of a phenolic liquid resin.

* * * * *